(12) United States Patent
Nilsson (10) Patent No.: US 9,745,894 B2
(45) Date of Patent: Aug. 29, 2017

(54) COMPRESSOR AIR PROVIDED TO COMBUSTION CHAMBER PLENUM AND TURBINE GUIDE VANE

(75) Inventor: Ulf Nilsson, Whetstone (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 653 days.

(21) Appl. No.: 14/352,129

(22) PCT Filed: Sep. 4, 2012

(86) PCT No.: PCT/EP2012/067201
§ 371 (c)(1),
(2), (4) Date: Apr. 16, 2014

(87) PCT Pub. No.: WO2013/060516
PCT Pub. Date: May 2, 2013

(65) Prior Publication Data
US 2014/0260292 A1    Sep. 18, 2014

(30) Foreign Application Priority Data

Oct. 24, 2011 (EP) .................................... 11186361

(51) Int. Cl.
*F02C 7/12* (2006.01)
*F02C 7/16* (2006.01)
(Continued)

(52) U.S. Cl.
CPC .................. *F02C 3/04* (2013.01); *F02C 3/14* (2013.01); *F02C 7/18* (2013.01); *F01D 25/08* (2013.01);
(Continued)

(58) Field of Classification Search
CPC ...... F02C 3/07; F02C 7/12; F02C 7/16; F02C 7/18; F01D 25/08; F01D 25/12
See application file for complete search history.

(56) References Cited

U.S. PATENT DOCUMENTS 2,584,899 A * 2/1952 McLeod ................. F01D 9/041
384/313
4,153,386 A * 5/1979 Leogrande .............. F01D 5/188
415/115
(Continued)

FOREIGN PATENT DOCUMENTS

DE          19629191 A1    1/1998
GB          2356671 A  *   5/2001 ................ F02C 7/12

*Primary Examiner* — Pascal M Bui Pho
*Assistant Examiner* — Eric Linderman
(74) *Attorney, Agent, or Firm* — Beusse Wolter Sanks & Maire (57) ABSTRACT

A gas turbine having a combustion chamber with exhaust section through which combustion gas is exhaustable, plenum chamber and compressor are provided. The plenum chamber is coupled to the compressor wherein a first quantity of compressed fluid is injectable therein at a radially inner wall of the plenum chamber. A guide vane section with at least one airfoil is coupled to the exhaust section so combustion gas is flowable against the airfoil. The exhaust section and guide vane section are housed inside the plenum chamber. The airfoil has a first flow chamber where a second quantity of compressed fluid is flowable through the guide vane section from the compressor in the direction from the inner wall to a outer wall of the plenum chamber before being discharged. The second quantity of compressed fluid streamable through the guide vane section is larger than the first quantity of the compressed fluid.

15 Claims, 3 Drawing Sheets

(51) Int. Cl.
*F02C 7/18* (2006.01)
*F01D 25/08* (2006.01)
*F01D 25/12* (2006.01)
*F02C 3/04* (2006.01)
*F02C 3/14* (2006.01)

(52) U.S. Cl.
CPC ............... *F01D 25/12* (2013.01); *F02C 7/12* (2013.01); *F02C 7/16* (2013.01); *F05D 2240/12* (2013.01); *F05D 2260/205* (2013.01); *F05D 2260/221* (2013.01); *Y02T 50/676* (2013.01)

(56) References Cited

U.S. PATENT DOCUMENTS

| | | | | |
|---|---|---|---|---|
| 4,302,148 A * | 11/1981 | Tubbs | ............... | F02C 7/18 415/115 |
| 4,962,640 A * | 10/1990 | Tobery | ............... | F01D 5/189 415/115 |
| 5,125,793 A * | 6/1992 | MacArthur | ............ | F01D 5/185 415/114 |
| 5,142,859 A * | 9/1992 | Glezer | ............... | F01D 5/082 415/115 |
| 5,320,485 A * | 6/1994 | Bourguignon | ......... | F01D 5/187 415/115 |
| 5,376,827 A * | 12/1994 | Hines | ............... | F01D 15/10 290/1 R |
| 5,394,687 A * | 3/1995 | Chen | ............... | F01D 9/02 60/785 |
| 5,592,820 A | 1/1997 | Desaulty | | |
| 5,782,076 A * | 7/1998 | Huber | ............... | F02C 7/08 415/115 |
| 5,839,283 A | 11/1998 | Doebbeling | | |
| 5,901,548 A * | 5/1999 | Coffinberry | .......... | F02C 7/2365 60/728 |
| 5,953,919 A | 9/1999 | Meylan | | |
| 6,089,010 A | 7/2000 | Gross | | |
| 6,098,395 A * | 8/2000 | North | ............... | F01D 5/085 60/782 |
| 6,612,114 B1 | 9/2003 | Klingels | | |
| 6,955,523 B2 * | 10/2005 | McClelland | ........... | F01D 9/041 415/115 |
| 7,225,624 B2 * | 6/2007 | Ress, Jr. | ................ | F01D 5/082 60/782 |
| 7,334,412 B2 * | 2/2008 | Tiemann | ............... | F01D 5/084 415/115 |
| 8,281,601 B2 * | 10/2012 | McMahan | ............... | F23R 3/26 60/752 |
| 8,495,883 B2 * | 7/2013 | Foust | ............... | F01D 9/023 60/39.23 |
| 8,893,512 B2 * | 11/2014 | Donahoo | ............... | F02C 7/12 416/97 R |
| 2002/0148214 A1 * | 10/2002 | Tiemann | ............... | F02C 6/003 60/39.17 |
| 2002/0148233 A1 * | 10/2002 | Tiemann | ............... | F01D 5/187 60/806 |
| 2003/0035717 A1 * | 2/2003 | Tiemann | ............... | F02C 7/185 415/115 |
| 2004/0066099 A1 * | 4/2004 | Weeber | ............... | H02K 9/12 310/58 |
| 2007/0234733 A1 * | 10/2007 | Harris | ............... | F01D 25/12 60/776 |
| 2008/0112794 A1 * | 5/2008 | Lee | ............... | F01D 5/189 415/115 |
| 2008/0286115 A1 * | 11/2008 | Liang | ............... | F01D 5/186 416/97 R |
| 2009/0133401 A1 * | 5/2009 | Suciu | ............... | F02C 3/073 60/734 |
| 2014/0030073 A1 * | 1/2014 | Lacy | ............... | F01D 25/12 415/177 |
| 2015/0010385 A1 * | 1/2015 | Oyarbide | ............... | F01D 25/12 415/115 |
| 2015/0354465 A1 * | 12/2015 | Suciu | ............... | F02C 3/04 60/782 |
| 2016/0003053 A1 * | 1/2016 | Propheter-Hinckley | | F01D 5/187 60/752 |
| 2016/0208631 A1 * | 7/2016 | Spangler | ............... | F01D 9/065 |
| 2016/0290157 A1 * | 10/2016 | Ning | ............... | F01D 11/08 |

\* cited by examiner

COMPRESSOR AIR PROVIDED TO COMBUSTION CHAMBER PLENUM AND TURBINE GUIDE VANE

CROSS REFERENCE TO RELATED APPLICATIONS

This application is the US National Stage of International Application No. PCT/EP2012/067201 filed Sep. 4, 2012, and claims the benefit thereof. The International Application claims the benefit of European Application No. EP11186361 filed Oct. 24, 2011. All of the applications are incorporated by reference herein in their entirety.

FIELD OF INVENTION

The present invention relates to a gas turbine and to a method for guiding compressed fluid in a gas turbine.

ART BACKGROUND

In gas turbines it is an aim to improve the efficiency of the gas turbine and in particular the efficiency of a gas turbine cycle, i.e. to increase the pressure ratio and the fired temperatures in a gas turbine. One way of increasing the efficiency of a given gas turbine cycle is to reduce the amount of cooling air used and thus allowing a longer expansion of high energy working fluid through the turbine resulting in an increase of the mechanical work that can be extracted from the turbine shaft.

A complex cooling system for a gas turbine with a high degree of tailoring in the distribution of cooling fluid over gas turbine components to be cooled is one way of reducing the total cooling air consumption. However, this method may give proper results for large scale components and geometries. When the size of the turbine components to be cooled decreases the relative size of e.g. the cooling apertures in comparison to the size of the components increase and the gain from sophisticated cooling air distribution techniques diminishes. The reason that the sizes of the cooling apertures cannot be further reduced are due to limitations in machining and manufacturing techniques of smaller turbine components and also in mitigating the risk that particles in the ambient air or from the internal component surfaces of the gas turbine will block narrow apertures and passages of such an internal cooling system with smaller apertures. As a consequence, a smaller gas turbine tends to use relatively more cooling air compared to larger gas turbines for the same gas turbine cycle and becomes therefore less efficient in respect of specific power and efficiency.

Hence, it is an aim to reduce the cooling fluid consumption. One way of reducing the cooling fluid consumption may be the use of serial cooling techniques where the same cooling fluid flow cools several parts of a component or of several different components.

DE 196 29 191 A1 discloses a device and a method for cooling a gas turbine with a ring-type combustion chamber. From a radially outer side a cooling fluid is fed into a ring channel. From the ring channel, the cooling fluid flows into a tube which is installed into a vane which is located at an exhaust section of the ring-type combustion chamber. A part of the cooling fluid flows from the ring channel along the radially outer wall of the combustion chamber and a further part of the cooling fluid which flows through the tube flows along a radially inner wall along the combustion chamber. The further part of the cooling fluid which has been flown through the tube may be guided to a blade which is located downstream and adjacent to the vane.

U.S. Pat. No. 5,953,919 A discloses a gas turbine comprising guide blades arranged between a combustion chamber and a turbine rotor. Guide blades are integrated in a respective associated combustion chamber of the gas turbine, wherein the guide blades and the associated combustion chamber wall are designed essentially in one piece and are constructed as a combustion chamber/guide blade unit. The unit is located at cool supporting structures of a gas turbine, wherein both together form cooling air passages which allow the combustion chamber to be cooled.

U.S. Pat. No. 5,320,485 A discloses a guide vane with a plurality of cooling circuits. The cooling circuits in the guide vane guides a cooling fluid through the interior of the vane while at the same time the pressure drop of the cooling fluid as it passes through the vane is minimized.

U.S. Pat. No. 5,592,820 A discloses a gas turbine diffuser for a turbo-jet engine, in which a plurality of diffuser inlets are arranged in a substantially circular array bounded by inner and outer diffuser walls and by a plurality of partitions extending generally radially from the axis of the annular diffuser.

U.S. Pat. No. 5,839,283 discloses mixing ducts for a gas turbine annular combustion chamber. In the gas turbine combustion chamber a row of pre-mixed burners are arranged in an annular form. A combustion air duct is designed as a diffuser which guides cooling fluid to each burner directly downstream of the compressor row.

SUMMARY OF THE INVENTION

It may be an objective of the present invention to provide a more efficient cooling of a gas turbine.

This objective may be solved by a gas turbine and by a method for guiding compressed fluid in a gas turbine according to the independent claims.

According to a first aspect of the present invention, a gas turbine is presented. The gas turbine comprises a combustion chamber, a plenum chamber, a compressor and a guide vane section. The combustion chamber comprises an exhaust section through which a combustion gas is exhaustible. The compressor is adapted for generating compressed fluid (e.g. compressed air). The plenum chamber is coupled to the compressor (e.g. by an intermediate coupling duct or tube) such that a first quantity of the compressed fluid is injectable into the plenum chamber at a radially inner side of the plenum chamber.

The guide vane section comprises at least one airfoil. The guide vane section is coupled to the exhaust section such that the combustion gas is flowable from the combustion chamber towards the airfoil. The exhaust section and the guide vane section are (at least partially) housed inside the plenum chamber.

The airfoil comprises a first flow chamber which is formed such that a second quantity of the compressed fluid is flowable through the guide vane section from the compressor in the direction from the radially inner side to a radially outer side of the plenum chamber before being discharged into the plenum chamber. The second quantity of compressed fluid which is streamable through the guide vane section is larger than the first quantity of compressed fluid.

According to a further aspect of the present invention, a method for guiding compressed fluid in a gas turbine is presented. According to the method, a compressed fluid is generated by a compressor. A first quantity of the compressed fluid is injected into a plenum chamber at a radially inner side of the plenum chamber which is coupled or in fluid connection to the compressor. A combustion gas is guided against at least one airfoil of a guide vane section, wherein the guide vane section is coupled or in fluid connection to an exhaust section of a combustion chamber through which exhaust section the combustion gas is exhaustible. The exhaust section and the guide vane section are housed inside the plenum chamber. A second quantity of the compressed fluid is guided through the guide vane section from the compressor in a direction from the radially inner side to a radially outer side of the plenum chamber before being discharged into the plenum chamber, wherein the airfoil comprises a first flow chamber which is formed such that at least a part of the second quantity of the compressed fluid is flowable through the guide vane section. The second quantity of compressed fluid which is streamable through the guide vane section is larger than the first quantity of compressed fluid.

In the gas turbine, the compressed fluid which is compressed by the compressor is guided by a channel to the radially inner wall of the plenum chamber. The channel may be formed by a separate tube or by a gap, e.g. an annulus, between inner and outer casing parts of the gas turbine. A major part of the compressed fluid is guided after flowing through the plenum chamber into the combustion chamber in which the compressed fluid is burned together with a fuel such that in the combustion chamber a combustion gas is generated. The combustion gas is guided through an exhaust section which is located downstream of the combustion chamber. At a downstream end of the exhaust section, the guide vane section and a rotor blade section is installed.

The terms axial direction, circumferential direction and radial direction refer to directions with respect to a turbine shaft of the gas turbine. The circumferential direction describes a run around the turbine shaft, the radial direction describes a run through a point of the rotating axis of the turbine shaft and the axial direction describes a run parallel to the rotating axis of the turbine shaft and along the main flow direction of the working fluid of the gas turbine. The axial direction and the radial direction are orientated in particular perpendicular with respect to each other.

Hence, the radially inner wall of the plenum chamber is located closer to the shaft than a radially outer wall of the plenum chamber, for example. The second quantity or at least a part of the second quantity may flow through the first flow chamber in the direction from the radially inner wall to a radially outer wall of the plenum chamber before being discharged into the plenum chamber. That is that the first flow chamber is formed in such a way that the second quantity or at least a part of the second quantity flows with a component along the radial direction away from the turbine shaft and the rotary axis of the gas turbine, respectively.

The guide vane section, e.g. the airfoils, the rotor blade section and the walls of the combustion chamber have to be cooled by the compressed fluid. Hence, before the compressed fluid enters the combustion chamber, the compressed fluid is guided along the outer wall of the combustion chamber for cooling purposes. A major portion of the compressed fluid enters the combustion chamber via the burner and a minor portion of the compressed fluid enters the combustion chamber via apertures in combustion chamber wall.

Hence, the plenum chamber surrounds the parts and components to be cooled such that a volume through which the compressed fluid is flowable is generated between inner walls of the plenum chamber and outer walls or through apertures of the components to be cooled. In particular, the plenum chamber surrounds at least a part of the combustion chamber with its exhaust section, the guide vane section, the rotor blade section and e.g. further downstream located components to be cooled, such as further guide vane sections or rotor blade sections.

By the present invention, the compressed fluid which is delivered by the compressor is separated, e.g. by a fluid separator, such as walls, valves or other means, into a first quantity and a second quantity. The first quantity of compressed fluid is directly injected into the plenum chamber through the radially inner wall of the plenum chamber. Hence, the first quantity of compressed fluid is injected for example into a region of the plenum chamber which is located between a radially inner wall of the combustion chamber and a radially inner wall of the plenum chamber.

The second quantity of compressed fluid is guided through the first flow chamber of the airfoil of the guide vane section, wherein the airfoil and the first flow chamber respectively are arranged such that the second quantity of pressurized fluid flows along a direction from the radially inner wall of the plenum chamber to a radially outer wall of the plenum chamber. The first flow chamber comprises a radially outer opening (with respect to a radially inner opening at the radially inner side of the plenum chamber) through which the second quantity of the compressed fluid is guided into the plenum chamber after flowing through the first flow chamber.

In particular, the second quantity of the compressed fluid is injected into a volume section of the plenum chamber which is located between a radially outer wall of the combustion chamber and a radially outer wall of the plenum chamber.

In the plenum chamber, the first quantity and the second quantity of the compressed fluid may be mixed together again. After being injected into the plenum chamber, the compressed fluid is guided along the outer walls of the combustion chamber to an injection portion of the combustion chamber, i.e. a burner, such as e.g. a swirler portion, into which the compressed fluid is injected and mixed with fuel for combustion in the inner volume of the combustion chamber, for example. After injecting the first quantity and the second quantity of compressed fluid into the plenum chamber, a further part of the compressed fluid cools the following parts in the compressed gas stream one after another in a serial way.

In particular, the guide vane section is cooled by the second quantity of pressurized and compressed fluid which flows through the first flow chamber.

In conventional approaches, the cooling fluid is fed from a radially outer location into the plenum chamber. Moreover, according to conventional approaches, tubes with a small diameter are installed into an airfoil of a guide vane section which is located in an exhaust section of a combustion chamber. Thereby, only a minor amount of the cooling fluid flows through the guide vane from the radially outer side to a radially inner side of the plenum chamber. The major part of the cooling fluid flows directly into the plenum chamber. Due to the small diameter of the tubes in the airfoils and thus due to the small flow diameter, a high pressure drop of the cooling fluid between an inlet section of the tube and an outlet section of the tube is caused which leads to a loss of a cooling efficiency and to an increasing of system complexity and system weight.

According to the present invention, a majority, in particular the second quantity, of the discharged compressed fluid from the compressor flows through the first flow chamber of the airfoils from the radial inner side (wall) to a radially outer side (wall) of the plenum chamber before it is discharged into the plenum chamber.

In order to guide a second quantity of compressed fluid, which is larger than the first quantity of the compressed fluid, through the guide vane device, an adapted larger first flow chamber has to be formed inside the airfoil of the guide vane device. Hence, the larger second quantity of compressed fluid may flow through the large designed first flow chamber. Because of the large second quantity, the guide vane section is cooled more efficiently. Additionally, because the larger designed first flow chamber, the pressure difference of the compressed fluid which enters the first flow chamber in comparison to the compressed fluid which exits the first flow chamber is reduced. Hence, the pressure loss and the kinematic energy loss of the second portion of the pressurized fluid are reduced for a given cooling requirement by the large designed volume and flow diameter of the first flow chamber. The first flow chamber is formed e.g. directly by the surrounding walls of the airfoil without the need of extra installed tubes. Hence, the cooling efficiency due to the higher mass flow of the second quantity of pressure fluid through the first flow chamber makes for example complex and cost intensive impingement plates inside the airfoils obsolete.

Additionally, in gas turbines, the compressor is located radially inwards and axially upstream in comparison to a combustion chamber and some components of the gas turbine to be cooled. Hence, by the present invention, the compressed fluid may be taken directly from the compressor and may be injected at the radially inner wall of the plenum chamber into the volume of the plenum chamber or into the first flow chamber.

According to a further exemplary embodiment, the gas turbine further comprises a diffuser. The diffuser is coupled to a radially outer end of the first flow chamber such that compressed fluid is guidable from the radially outer end of the first flow chamber into the plenum chamber. The radially outer end of the first flow chamber is located more radially outwards in comparison to a radially inner end of the first flow chamber. The radially inner end of the first flow chamber is connected for example to the radially inner wall of the plenum chamber, wherein the second quantity of the pressure fluid is directly injected at the radially inner end of the first flow chamber without flowing through a volume of the plenum chamber.

The diffuser increases its flow cross section (i.e. its flow diameter or hydraulic diameter) along a run from the radially outer end of the first flow chamber to an open end of the diffuser where the second quantity of the compressed fluid is injected into the plenum chamber. By increasing the flow diameter of the diffuser a part of the kinetic energy which may be lost along the flow through the first flow chamber may be recovered. In other words, the diffuser comprises a first flow diameter (hydraulic diameter) and a second flow diameter (hydraulic diameter), wherein the first flow diameter corresponds to a flow diameter at the radially outer end of the first flow chamber and wherein the first flow diameter differs to the second flow diameter. The first flow diameter and/or the second flow diameter may comprise for example a circular, elliptical, square or rectangular shape.

Furthermore, the attachment of the diffuser at the radially outer end of the first flow chamber inside the plenum chamber instead of an installation location of the diffuser close to the compressor causes that more free space between the compressor and the turbine is available such that e.g. more compressor stages may be added without needing more internal space for the diffuser in a compressor duct. Hence, a higher overall pressure ratio in the cycle and thereby an improved efficiency may be generated without increasing the size, i.e. the axial length, of the gas turbine.

According to a further exemplary embodiment, the airfoil comprises an inner wall section which forms the first flow chamber. The inner wall section comprises turbulent enhancing elements such that turbulences in the second quantity of the compressed fluid which is flowable through the first flow chamber are generated. By generating the above-mentioned turbulences in the first flow chamber, the cooling efficiency for cooling the airfoil of the guide vane section is improved. The turbulence enhancing elements may be formed of protrusions or cavities at an inner surface of the inner wall section which faces the volume of the first flow chamber and which is in contact with the second quantity of the compressed fluid, respectively.

According to a further exemplary embodiment, the first flow chamber comprises a first volume, wherein the airfoil comprises a second flow chamber with a second volume. The second flow chamber is formed into the airfoil such that compressed fluid is flowable along a direction from the radially outer wall to the radially inner wall of the plenum chamber or along a direction from the radially inner wall to the radially outer wall of the plenum chamber. In other words, the second flow chamber is formed in such a way that the compressed fluid inside the plenum chamber flows along a direction which has a component that is aligned in radial direction to the rotary axis of the gas turbine. In particular, the first flow chamber is located in a region of the leading edge of the airfoil and the second flow chamber is located close to the trailing edge of the airfoil. Hence, the smaller conduit near the trailing edge of the airfoil provides by the pressurized fluid a cooling of the trailing edge of the airfoil. The second flow chamber is fed by pressurized fluid which was first used to cool the plenum chamber components, for example an outer platform of the guide vane device.

According to a further exemplary embodiment, the first flow chamber and the second flow chamber are formed inside the airfoil such that a ratio of the first volume of the first flow chamber to the second volume of the second flow chamber is more than 70:30, in particular more than 80:20 and more in particular more than 90:10. This outlines that the volume of the first flow chamber is much larger than the volume of the second flow chamber. The design and the size of the first volume causes that the high amount of cooling air (the pressurized fluid) is flowable through the first flow chamber without generating high pressure drop and energy losses of the second quantity of the pressurized fluid. The design and the size of the second volume allows a minimum amount of cooling air to be released from the guide vane into the main flow path and still enabling an efficient cooling of the least accessible areas of the guide vane.

According to a further exemplary embodiment, the second flow chamber is fed by compressed fluid that is collected from cooling fluid streaming along the vane inner platform of the guide vane section. Hence, the compressed fluid streaming into the second flow chamber is collected on the same side of airfoil where it enters the first flow chamber.

According to a further exemplary embodiment, the airfoil comprises a dividing wall which separates the first flow chamber and the second flow chamber. The dividing wall comprises at least one through-hole for guiding a predefined quantity of the second quantity of the compressed fluid flowing through the first flow chamber to the second flow chamber. Hence, if a higher mass flow or a cooler compressed fluid in the second volume of the second flow chamber is needed additional compressed fluid may be supplied by the first flow chamber.

Hence, a better adjustment of the mass flows and of the fluid temperature in the first flow chamber and the second flow chamber is achieved.

According to a further exemplary embodiment, the airfoil comprises the trailing edge. The airfoil is formed such that a further defined quantity of compressed fluid flowing through the second flow chamber is exhaustible into the exhaust section. By exhausting a further predefined quantity through e.g. opening regions in the trailing edge of the airfoil, the further predefined quantity of compressed fluid is mixable with the combustion fluid, such that parameters of the combustion fluid (such as temperature, pressure, etc.) may be affected accordingly.

According to a further exemplary embodiment, the gas turbine further comprises the rotor blade section with a radially blade inner platform and a blade airfoil, wherein an internal flow path is in fluid connection with the radially inner guide vane platform. The rotor blade section is located downstream adjacent to the guide vane section. The rotor blade section is coupled to the guide vane section such that compressed fluid, which is collected from a cooling fluid streaming along the vane inner platform of the guide vane section, is guidable to the blade inner platform and the blade airfoil of the rotor blade section. Hence, by taking the air from the inner guide vane platform area, the rotor blade section is easy to reach without needing complex installations. Hence, a proper cooling of the inner platform of the guide vane and of the rotor blade section is achieved. Furthermore, if the pressure drop spent for cooling the vane inner platform of the guide vane is equal or lower than that spend on cooling the airfoil, i.e. than that spend inside the first flow chamber, the important feed fluid pressure at the inlet of the cooling passage which leads the fluid to the rotor blade section may be equal or higher than for conventional designs.

According to a further exemplary embodiment, the guide vane section comprises a further airfoil, wherein the further airfoil comprises a further first flow chamber. The first flow chamber and the second first flow chamber are formed such that the second quantity of the compressed fluid is flowable through the guide vane section from the compressor in the direction from the radially inner side to a radially outer side of the plenum chamber before being discharged into the plenum chamber. The airfoil and the further airfoil are installed adjacent along a circumferential direction in one common exhaust section. The compressed fluid flowing through the first flow chamber and the further first flow chamber may define the second quantity of the compressed fluid flowing the guide vane section. However, each subportion of the second quantity of the compressed fluid flowing through the airfoil or the further airfoil is larger than the first quantity being directly injected into the plenum chamber after leaving the compressor.

According to a further exemplary embodiment, the combustion chamber is a can-type combustion chamber or an annular-type combustion chamber. The can-type combustion chambers are self-contained cylindrical combustion chambers, wherein each can-type combustion chamber has e.g. its own fuel injector and liner, and may have its own ignition and casing. Each can-type combustion chamber may be arranged along the circumferential direction adjacent to further can-type combustion chambers.

The annular-type combustion chamber does not have separate combustion zones and simply have e.g. a continuous liner and casing in a ring shape, i.e. an annulus, along the circumferential direction.

By the improved cooling efficiency of the gas turbine according to the present invention, the cooling air consumption may be reduced for example by 30% to 50% compared to conventional designs where only a minor quantity of pressurized fluid flows through the airfoils of the guide vanes located in an exhaust section of a combustion chamber. Depending on the gas turbine cycle data the effective inlet temperature to the turbine with maintained flame temperature in the combustion chamber may be also increased by 30° to 70° Celsius due to the less cooling air spend achieved by the present invention. If lower emissions are desired, a reduced flame temperature for a given turbine inlet temperature may also be provided.

An increase of the turbine inlet temperature results in increased specific power and an increased power output for example up to 10%. Moreover, the increased combustion inlet temperature from the heat pick up from the guide vane tends to have a stabilizing effect on the combustion performance offering improved emissions and operability with a lower risk of combustion instabilities.

It has to be noted that embodiments of the invention have been described with reference to different subject matters.

In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematically. It is noted that in different figures, similar or identical elements are provided with the same reference signs.

Figure 1:
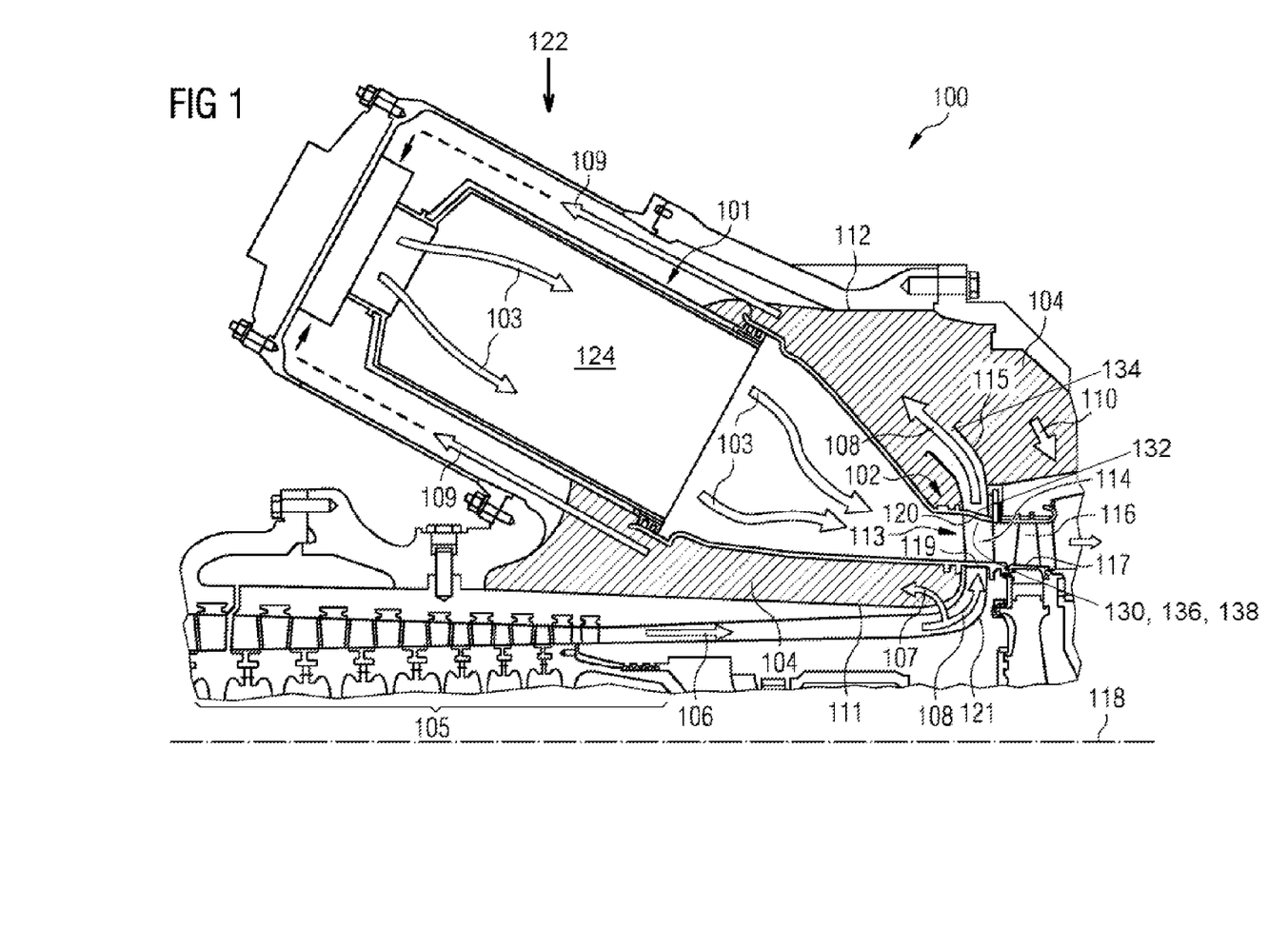
FIG. 1 shows a sectional view of a gas turbine according to an exemplary embodiment of the present invention.

FIG. 1 shows a gas turbine 100 according to an exemplary embodiment of the present invention. The gas turbine 100 comprises a can-annular combustor arrangement 122 comprising an array of can-combustors 124, each can-combustor 124 comprising a combustion chamber 101 with an exhaust section 102 through which a combustion gas 103 is exhaustible. Moreover, the gas turbine 100 comprises a plenum chamber 104 and a compressor 105 for generating a compressed fluid 106. The plenum chamber 104 is coupled to the compressor 105 such that a first quantity 107 of the compressed fluid 106 is injectable into the plenum chamber 104 at a radially inner wall 111 of the plenum chamber 104. The gas turbine 100 further comprises a guide vane section 113 with at least one airfoil 114, wherein the guide vane section 113 is coupled to the exhaust section 102 such that the combustion gas 103 is flowable towards the airfoil 114. The exhaust section 102 and the guide vane section 113 are housed inside the plenum chamber 104.

The airfoil 114 comprises a first flow chamber 201 (see FIG. 2) which is formed such that a second quantity 108 of the compressed fluid 106 is flowable through the guide vane section 113 from the compressor 105 in the direction from the radially inner wall 111 to a radially outer wall 112 of the plenum chamber 104 before being discharged into the plenum chamber 104. In particular, the compressed fluid 106 is flowable through the guide vane section 113 from the compressor 105 in the direction from a vane inner platform 119 to a vane outer platform 120 of the guide vane section 113. The second quantity 108 of the compressed fluid 106 which is streamable through the guide vane section 113 is larger than the first quantity 107 of the compressed fluid 106.

In FIG. 1 the rotary axis 118 of a turbine shaft is shown, wherein the rotary axis 118 defines the axial direction which is parallel to the rotary axis and defines the radial direction which is perpendicular to the axial direction and which runs through the center point of the turbine shaft.

The compressor 105 generates the compressed fluid 106. The compressed fluid 106 is guided by a channel which may be formed by a conduit, e.g. a tube, or by a volume between radially adjacent inner and outer parts of the gas turbine 111 to the plenum chamber 104.

The plenum chamber 104 surrounds at least partially the combustion chamber 101 and its exhaust section 102 as well as the guide vane section 113, a rotary blade section and for example further downstream located elements of the gas turbine 100. Between the walls 111,112 of the plenum chamber 104 and the components of the gas turbine 100 which are located inside the plenum chamber 104 a volume for the compressed fluid 106 is generated. Inside the volume, the compressed fluid 106 may flow along the components of the gas turbine 100 which are located inside the volume of the plenum chamber 104.

A first quantity 107 of the compressed fluid 106 is injected or bled off according to the present invention at the radially inner located wall 111 of the plenum chamber 104. The second quantity 108 of the compressed fluid 106 is guided from the compressor 105 to an inlet conduit 121 which connects a supply conduit of the compressed fluid 106 with the first flow chamber 201. For example, the inlet conduit 121 is fixed to the vane inner platform 119. The flow cross section of the inlet conduit 121 at the interface to the first flow chamber 201 is equal or smaller than the flow cross section of the inlet conduit 121 at its upstream end.

If the flow cross section of the inlet conduit 121 at the interface to the first flow chamber 201 is smaller than the flow cross section of the upstream end a beneficial change in fluid characteristics (pressure and velocity changes) of the compressed fluid 106 streaming into the first flow chamber 201 is achieved i.e. the inlet losses are minimized and the flow resistance in the interface between the inlet conduit 121 and the first flow chamber 201 is reduced, because no flanges or edges protrude in the flow cross sections at the interface region.

Furthermore, the inlet conduit 121 may in particular have a gradual change in flow cross section from an oval or polygonal shape at its inlet to match the profile of the cross section of the first flow chamber 201 at the interface, for example. The second quantity 108 flows via the first flow chamber 201, the interior part of the airfoil 114, from a radially inner section to a radially outer section of the airfoil 114 before being injected into the volume of the plenum chamber 104.

At the radially outer end 130 of the first flow chamber 201 which is located at the radially outer section, i.e. at the radially vane outer platform 120, of the airfoil 114 a diffuser 115 is installed. The diffuser 115 may comprise a first flow diameter 132 and a second flow diameter 134, wherein the first flow diameter 132 corresponds to a flow diameter 136 at the radially outer end of the first flow chamber 201, wherein the first flow diameter 132 differs to the second flow diameter 134. In particular, the second flow diameter 134 comprises a larger diameter in comparison to the first flow diameter 132. Preferably, the first flow diameter 132 matches the shape of the profile of the cross section 138 of the first flow chamber 201. Hence, kinetic and pressure losses of the second quantity 108 caused by flowing through the first flow chamber 201 may be reduced. The first quantity 107 and the second quantity 108 are mixed together after flowing through the first flow chamber 201 inside the plenum chamber 104, wherein a part of the mixed compressed fluid 109 may flow along the exhaust section 102 and the outer wall of the combustion chamber 101 for cooling purposes. After approaching an axial end at an upstream location of the combustion chamber 101, the compressed fluid 109 is injected into a burner or a swirler, mixed with fuel and is thus injected into the inside of the combustion chamber 101. In the combustion chamber 101 the mixture of compressed fluid 109 and fuel is burnt such that a combustion gas 103 is generated. A portion of the compressed fluid 109 is used to cool the components of the combustion chamber 101 and the exhaust section 102.

The combustion gas 103 flows with at least one component along a downstream direction inside the combustion chamber 101. At a downstream end section of the exhaust section 102, the guide vane section 113 is located, such that the combustion gas 103 is guided by the airfoil 114 of the guide vane section 113.

A further part of the mixed compressed fluid 110 may be used for cooling further downstream located components of the gas turbine 100, e.g. additional guide vane sections, casing components and/or additional rotor blade sections.

A blade airfoil 116 of a rotor blade section is located adjacent and downstream of the airfoil 114 inside the end section of the exhaust section 102. The rotor blade section may be a first stage of a high pressure turbine of the gas turbine 100.

The rotary blade section comprises a blade inner platform 117 from which the blade airfoil 116 extends inside the exhaust section 102. The blade inner platform 117 may comprise a circumferential run or a segmented design of several blade inner platforms 117, wherein to the blade inner platform 117 also an individual or a plurality of blade airfoils 116 may be attached.

Figure 2:
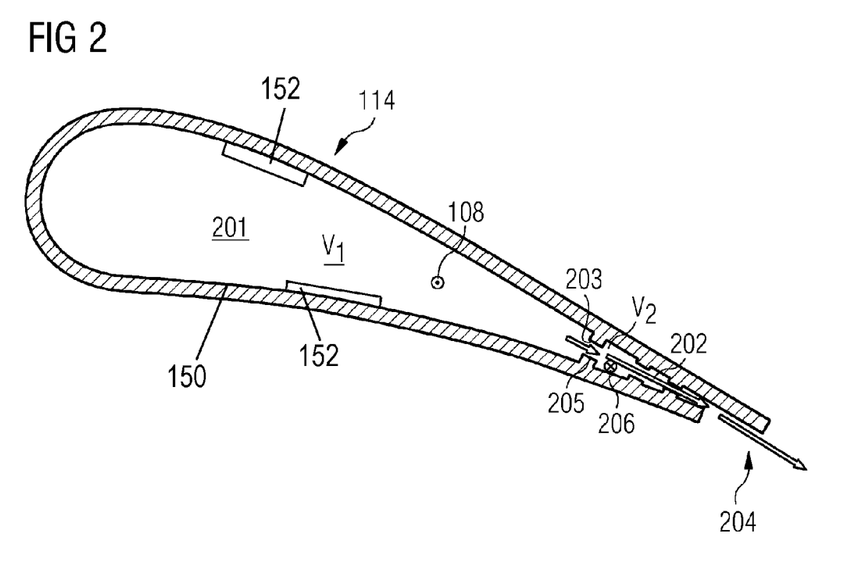
FIG. 2 shows a schematical view of a cross-section of an airfoil according to an exemplary embodiment of the present invention.

FIG. 2 shows a cross-section of the airfoil 114 having an inner wall section 150 and turbulence enhancing features 152. The airfoil 114 comprises the first flow chamber 201 and a second flow chamber 202. Along a cord of the airfoil 114, the first flow chamber 201 is located closer to a leading edge of the airfoil 114, whereas the second flow chamber 202 is located closer to the trailing edge 204 of the airfoil 114 in comparison to the first flow chamber 201.

Moreover, FIG. 2 shows that the first volume VI of the first flow chamber 201 is much larger than a second volume V2 of the second flow chamber 202. Hence, a high amount of compressed fluid, such as the second quantity 108 of the compressed fluid 106, is flowable through the first flow chamber 201 without having high fluid flow losses which may be caused due to a restrictor effect, for example. In the second flow chamber 202 a compressed fluid 206 may flow from an outer or an inner volume of the plenum chamber 104 through the second flow chamber 202.

More particularly, before the second quantity 108 enters the second volume V2 of the second flow chamber 202, the second quantity 108 has already cooled the platform of e.g. the guide vane, in particular the vane inner platform 119. Hence, the flow of the cooling fluid cools along a predefined flow direction one component after the other in a serial manner, such that a serial cooling flow is generated. Such a serial cooling flow, which passes along its flow a plurality of adjacent turbine components, has the benefit that it is not necessary to release the cooling air into the hot working fluid flow after each component required to be cooled and hence the used cooling air flow can be minimized.

The preferred arrangement is for a portion the second quantity 108 to be used for cooling the vane outer platform 120 of the guide vane section 113 before the second quantity 108 of the compressed fluid 106 enters the second volume V2. As indicated in FIG. 2, the flow direction of the second quantity 108 in the first flow chamber 201 and the flow direction of a compressed fluid in the second flow chamber 202 are then opposed with respect to each other.

In particular, the second quantity 108 of compressed fluid flows along a radial direction away from the rotary axis 118, whereas the compressed fluid 206 inside the second flow chamber 202 flows along the radial direction to the rotary axis 118.

In some circumstances it may be preferable to cool the vane inner platform 119 and the vane outer platform 120 using the second quantity 108, wherein a first amount of the second quantity 108 cools the inner platform 119 and a further second amount of the second quantity 108 cools the outer platform 120. After cooling the inner platform 119 and the outer platform 120, the first amount and the second amount respectively of the cooling air is fed to the second volume V2 at a corresponding end (radial inner and radial outer end). At the corresponding end, the first amount and the second amount flows e.g. in opposite directions towards each other.

Furthermore, a dividing wall 205 may separate the first volume VI of the first flow chamber 201 from the second volume V2 of the second flow chamber 202. In the dividing wall 205 a through-hole 203 may be formed such that additional mass flow from the second quantity 108 of compressed fluid 106 in the first flow chamber 201 may flow to the second flow chamber 202 for increasing the mass flow or adjusting the flow distribution inside the second flow chamber 202.

At the trailing edge 204, a further opening may be formed such that the compressed fluid 206 inside the second flow chamber 202 may stream outside into the volume of the exhaust section so that the exhausted compressed fluid 206 is mixed with the combustion gas 103.

Figure 3:
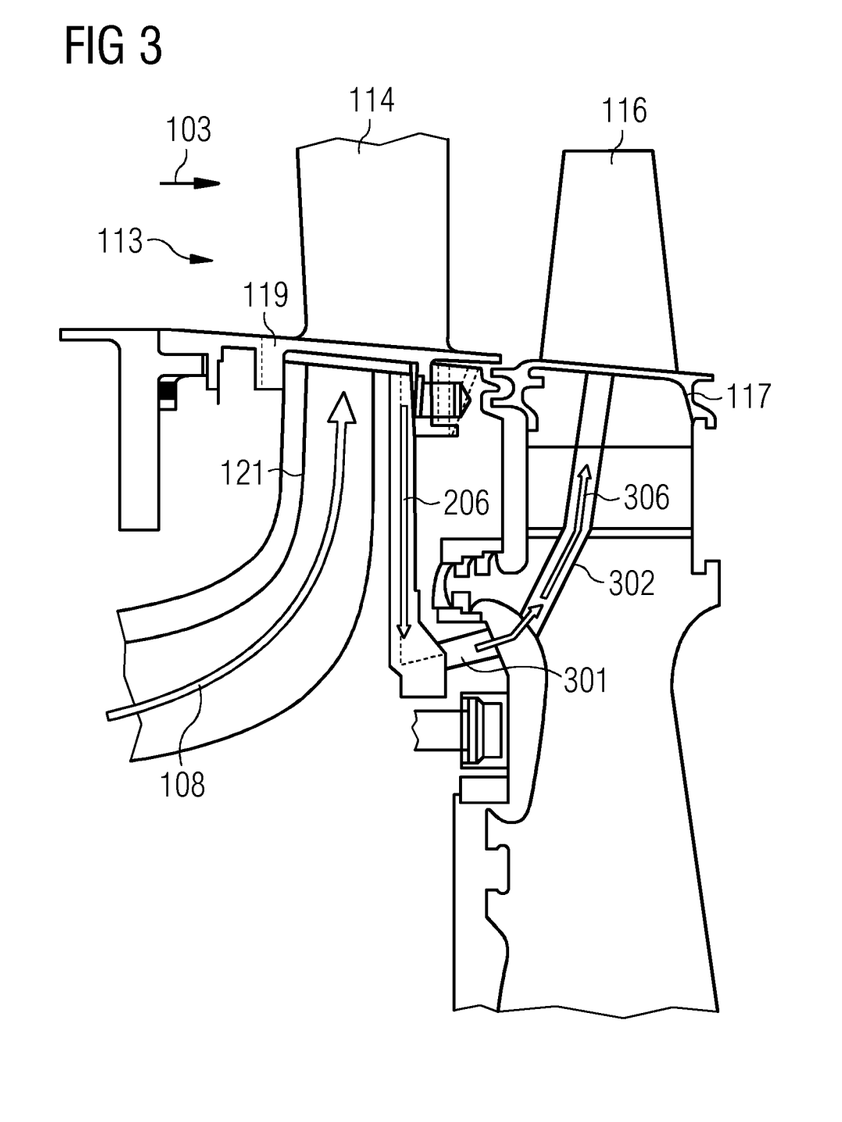
FIG. 3 shows a schematical view of the guide vane section and the rotating blade section according to an exemplary embodiment of the present invention.

FIG. 3 shows an enlarged view of the guide vane section 113 and the rotary blade section. The combustion gas 103 streams against the airfoil 114 and streams further downstream against the blade airfoil 116. The rotary blade section comprises a blade inner platform 117 from which the blade airfoil 116 extends inside the exhaust section 102. To the blade inner platform 117 may one or more blade airfoil (s) 116 be attached. A multiple of blade inner platforms 117 makes up a circumferential run around the turbine disc.

By an air channel i.e. a nozzle 301 and a further air channel 302 the compressed fluid 306, which exits the collection point for the portion of the second quantity 108 that has been used to cool the vane inner platform 119 of the guide vane section 113, may be guided to the blade inner platform 117 and onwards to the blade airfoil 116 and its interior for cooling purposes, via the cooling entrance in a turbine disc channel 302 and the blade root.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A gas turbine comprising
a combustion chamber with an exhaust section through which a combustion gas exhausts,
a plenum chamber,
a compressor for generating a compressed fluid,
wherein the plenum chamber is coupled to the compressor such that a first quantity of the compressed fluid is injectable into the plenum chamber at a radially inner wall of the plenum chamber,
a guide vane section comprising an airfoil, a vane inner platform and a vane outer platform,
wherein the guide vane section is coupled to the exhaust section such that the combustion gas flows against the airfoil,
wherein the exhaust section and the guide vane section are housed inside the plenum chamber, wherein the airfoil comprises a first flow chamber which is configured such that a second quantity of the compressed fluid flows through the guide vane section from the compressor in a direction from the radially inner wall to a radially outer wall of the plenum chamber before being discharged into the plenum chamber in a radially outward direction, and
wherein the second quantity of the compressed fluid is larger than the first quantity of the compressed fluid, and
a diffuser, wherein the diffuser is directly attached to the vane outer platform such that the second quantity of the compressed fluid is guidable from the radially outer end of the first flow chamber through the diffuser and into the plenum chamber in a radially outward direction.

2. The gas turbine according to claim 1, wherein the diffuser comprises a first flow cross-section and a second flow cross-section, wherein the first flow cross-section corresponds to a flow cross-section at the radially outer end of the first flow chamber, wherein the first flow cross-section differs to the second flow cross-section.

3. The gas turbine according to claim 2 wherein the second flow cross-section has a larger flow cross-section than the first flow cross-section.

4. The gas turbine according to claim 1, wherein the airfoil comprises an inner wall section which forms the first flow chamber,
wherein the inner wall section comprises turbulence enhancing elements such that turbulences in the compressed fluid which is flowable through the first flow chamber are generated.

5. The gas turbine according to claim 1, wherein the first flow chamber of the airfoil comprises a first volume (V1),
wherein the airfoil further comprises a second flow chamber with a second volume (V2), and
wherein the second flow chamber is formed within the airfoil such that a part of the second quantity of the compressed fluid is flowable along a direction from the radially outer wall to the radially inner wall of the plenum chamber and/or along the direction from the radially inner wall to the radially outer wall of the plenum chamber.

6. The gas turbine according to claim 5,
wherein the first flow chamber and the second flow chamber are formed inside the airfoil such that a ratio of the first volume (V1) of the first flow chamber to the second volume (V2) of the second flow chamber is more than 70 to 30.

7. The gas turbine according to claim 6 wherein the ratio of the first volume (V1) of the first flow chamber to the second volume (V2) of the second flow chamber is more than 80 to 20.

8. The gas turbine according to claim 6, wherein the second quantity of the compressed fluid comprises a majority of all compressed fluid generated by the compressor.

9. The gas turbine according to claim 6, further comprising an inlet conduit comprising:
a conduit inlet configured to receive the compressed fluid directly from the compressor;
a conduit outlet configured to deliver the second quantity of the compressed fluid directly to the airfoil.

10. The gas turbine according to claim 5,
wherein the second flow chamber is fed by compressed fluid which first cooled a vane inner platform and/or a vane outer platform of the guide vane section.

11. The gas turbine according to claim 5, wherein the airfoil comprises a trailing edge,
wherein the airfoil is formed such that a further predefined quantity of compressed fluid flowing through the second flow chamber exhausts into the exhaust section.

12. The gas turbine according to claim 5,
wherein the airfoil comprises a dividing wall which separates the first flow chamber and the second flow chamber,
wherein the dividing wall comprises at least one through-hole configured to guide a predefined quantity of the second quantity of the compressed fluid flowing through the first flow chamber to the second flow chamber.

13. The gas turbine according to claim 1, further comprising
a rotor blade section comprising a blade inner platform and a blade airfoil,
wherein the rotor blade section is located downstream and adjacent to the guide vane section, and
wherein the rotor blade section is coupled to the guide vane section such that compressed fluid is collected from compressed fluid used to cool a vane inner platform of the guide vane section and is routed to the blade inner platform and the blade airfoil of the rotor blade section.

14. The gas turbine according to claim 1,
wherein the combustion chamber is a can-type combustion chamber or an annular-type combustion chamber.

15. A method for guiding compressed fluid in a gas turbine, the method comprising
generating a compressed fluid by a compressor,
injecting a first quantity of the compressed fluid into a plenum chamber at a radially inner wall of the plenum chamber which is coupled to the compressor,
guiding a combustion gas against an airfoil of a guide vane section,
wherein the guide vane section is coupled to an exhaust section of a combustion chamber through which exhaust section the combustion gas exhausts, wherein the exhaust section and the guide vane section are housed inside the plenum chamber, and
guiding a second quantity of the compressed fluid through a first flow chamber of the airfoil of the guide vane section from the compressor in a direction from the radially inner wall to a radially outer wall of the plenum chamber and then the through a diffuser that is directly attached to a radially outer end of the first flow chamber before discharging the second quantity of the compressed fluid from the diffuser into the plenum chamber in a radially outward direction,
wherein the second quantity of the compressed fluid is larger than the first quantity of the compressed fluid.

* * * * *